United States Patent
Holdampf

(10) Patent No.: US 7,255,400 B2
(45) Date of Patent: Aug. 14, 2007

(54) TUBELESS HEADREST SUPPORT SYSTEM

(75) Inventor: Carl J. Holdampf, Farmington Hills, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 0 days.

(21) Appl. No.: 11/065,110

(22) Filed: Feb. 23, 2005

(65) Prior Publication Data

US 2005/0184572 A1     Aug. 25, 2005

Related U.S. Application Data

(60) Provisional application No. 60/546,732, filed on Feb. 23, 2004.

(51) Int. Cl.
*A47C 7/36*     (2006.01)
*A47C 7/02*     (2006.01)
*B60N 2/48*     (2006.01)

(52) U.S. Cl. .................................. 297/391; 297/452.18

(58) Field of Classification Search ................ 297/391, 297/452.18, 452.2

See application file for complete search history.

(56) References Cited

U.S. PATENT DOCUMENTS

| | | | |
|---|---|---|---|
| 3,512,832 A | | 5/1970 | Kage |
| 4,854,642 A | * | 8/1989 | Vidwans et al. ............ 297/410 |
| 5,397,170 A | * | 3/1995 | Shrock .................. 297/452.18 |
| 5,626,396 A | * | 5/1997 | Kuragano et al. ....... 297/452.2 |
| 5,788,250 A | | 8/1998 | Masters |
| 5,816,658 A | * | 10/1998 | Wallis ........................ 297/410 |
| 5,988,756 A | | 11/1999 | Aufrere |
| 6,062,645 A | * | 5/2000 | Russell ....................... 297/410 |
| 6,709,061 B2 | * | 3/2004 | McWhinnie et al. .. 297/452.18 |
| 2004/0021360 A1 | * | 2/2004 | Key et al. .............. 297/452.18 |

* cited by examiner

*Primary Examiner*—David R. Dunn
*Assistant Examiner*—Tania Abraham
(74) *Attorney, Agent, or Firm*—Clark Hill PLC

(57) ABSTRACT

A headrest support system comprises a seatback support frame having an upper cross member adapted to support a headrest. The cross member has opposite top and bottom surfaces with axially aligned holes formed therethrough. A headrest guide sleeve is received through each of the axially aligned holes formed in the cross member to coupled the headrest to the support frame. The holes include outward extending flanges defining an inner contact surface for engaging and supporting the headrest guide sleeve.

6 Claims, 2 Drawing Sheets

TUBELESS HEADREST SUPPORT SYSTEM

CROSS-REFERENCE TO RELATED APPLICATION

This application claims priority to and all the benefits of U.S. Provisional Application 60/546,732, filed on Feb. 23, 2004.

BACKGROUND OF THE INVENTION

1. Field of the Invention

This invention relates to a headrest support system for an automotive seat assembly, and more particularly, to a tubeless headrest support system for an automotive seat assembly.

2. Description of the Related Art

Automotive seat assemblies generally include a seat cushion interconnected with a seatback wherein the seatback may be pivotally moveable with respect to the seat cushion. The seatback generally includes a seatback frame over which is placed a foam pad and trim covering material. Typically, an adjustable headrest is operatively coupled to the seatback frame for movement by an occupant of the seat assembly. The headrest generally includes a headrest support portion mounted on a pair of elongated support posts. Each of the posts are received within cylindrical headrest guide sleeves for providing selective vertical adjustment of the headrest relative to the seat back. The seatback frame includes an upper cross member for supporting the headrest above the seatback.

Common practice in the automotive industry includes welding or attaching short vertical tubes to the upper cross member of the seatback frame for receiving the headrest guide sleeves that interact with the headrest posts and mounted the headrest to the seatback. The tubes, however, are relatively expensive and are subject to misalignments and distortion when welded to the seatback frame. For example, it is known in the art that heating of the tube structures during a welding operation can cause a geometric distortion resulting in a misalignment with a headrest support posts and causing high operating efforts when the headrest height is adjusted by the occupant of the vehicle.

Therefore, there is a need in the art for a cost effective and geometrically reliable headrest support system.

SUMMARY OF THE INVENTION

According to one aspect of the invention, there is provided a headrest support system comprising a seatback support frame having an upper cross member adapted to support a headrest. The cross member has opposite top and bottom surfaces with axially aligned holes formed therethrough. A headrest guide sleeve is received through each of the axially aligned holes formed in the cross member to coupled the headrest to the support frame. The holes include outward extending flanges defining an inner contact surface for engaging and supporting the headrest guide sleeve.

DETAILED DESCRIPTION OF THE PREFERRED EMBODIMENTS

Figure 1:
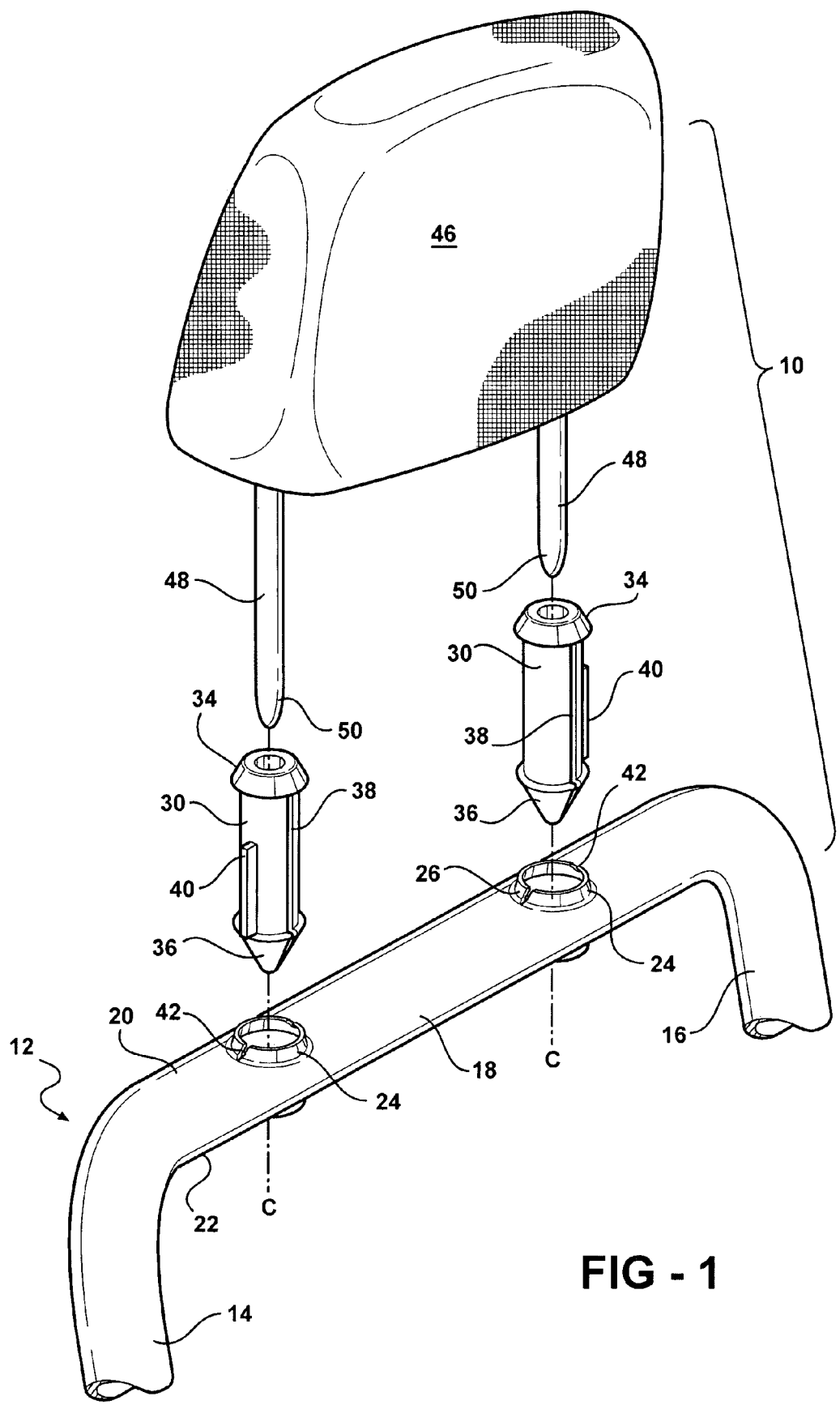
FIG. 1 is an exploded view of the headrest support system.

Referring to FIG. 1 there is shown in exploded view a headrest support system 10 according to the preferred embodiment and a seatback support frame 12 for an automotive seat assembly. The seatback support frame 12 includes a generally U-shaped member having side members 14, 16 interconnected at their upper ends by cross member 18. The seatback support frame 12 is generally pivotally coupled to a seat cushion and supports a cellular foam pad encased in a trim cover for supporting an occupant within the seat assembly. The support frame 12 as shown is a one-piece bent tube seatback frame. However, it should be appreciated that the support frame 12 may include a separate, interconnected side members 14, 16 and upper cross member 18. Additionally, the side members 14, 16 and upper cross member 18 are each shown as a tube; however, it should be appreciated that any of the members 14, 16, 18 may be a box frame section, C-shaped, U-shaped, I-beam shaped section or other type of stamped, extruded, or otherwise formed member having opposing surfaces without varying from the scope of the invention.

Figure 2:
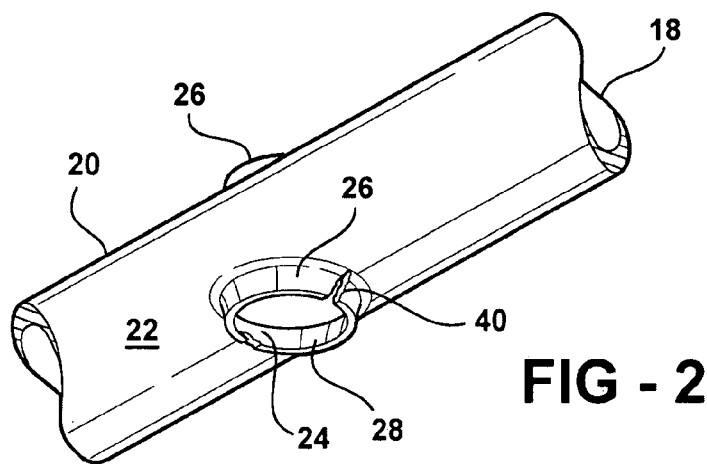
FIG. 2 is a perspective view of the headrest support system detailing the flanges formed on the seatback cross member.

Referring to FIGS. 1 and 2, the cross member 18 includes a top surface 20 and an opposite bottom surface 22. A generally circular hole 24 is formed in each of the top and bottom surfaces 20, 22 defining an axially aligned center axis C.

Figure 3:
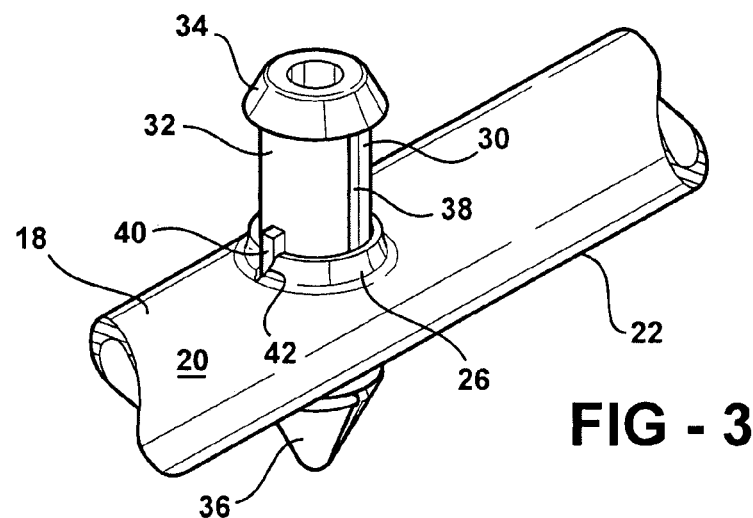
FIG. 3 is a perspective view detailing a headrest guide sleeve received in the cross member.

As shown in FIGS. 1-3, the holes 24 include flanges 26 extending, or flared, outwardly to define an inner contact surface 28 for supporting a headrest guide sleeve 30, as will be discussed in more detail below. Generally, the holes 24 are cut, stamped, punched or otherwise formed into the top and bottom surfaces 20, 22 of the seatback cross member 18 and aligned axially between the top and bottom surfaces 20, 22. The front and back edges of the holes 24 are then flanged, or flared, outwardly and upwardly to provide the inner contact surface 28 to support the headrest guide sleeves 30. In the embodiment shown in FIG. 3, a spaced apart pair of axially aligned holes 24 are formed in the cross member 18, each for receiving a headrest guide sleeve 30 therein.

Referring to FIGS. 1 and 3, an assembly view of a headrest guide sleeve 30 and cross member 18 is shown in detail. The headrest guide sleeve 30 is a generally cylindrical annular tube member disposed within the holes 24 formed in cross member 18. The headrest guide sleeve 30 includes a tubular body portion 32 extending longitudinally between a flanged disc-shaped top end 34 and a tapered distal bottom end 36. A slot 38 is formed in the body portion 32 and extends between the top end 34 and bottom end 36 to allow the guide sleeve 30 to flex or compress during insertion and assembly into the holes 24 in the cross member 18. The disc-shaped top end 34 has a diameter larger than the diameter of the holes 24 to limit the vertical position of the guide sleeve 30 within the holes 24 above the top surface 20 of the cross member 18. The guide sleeve 30 further includes a raised rib 40 extending longitudinally along the body portion 32 to the tapered bottom end 36. In a preferred aspect of the present invention, the headrest guide sleeve 30 is formed of a plastic material easily molded to include the above-described features.

In another aspect of the present invention, the hole 24 formed in the top surface 20 of the cross member 18 includes a slot, notch, or other irregularity 42 that receives the rib 40 formed on the headrest guide sleeve 30 to provide rotational location and orientation of the headrest guide sleeve 30 within the holes 24 formed in the cross member 18. The slot or irregularity 42 is preferably only applied to one hole 24 of the spaced pair of holes that receive the headrest guide sleeves 30. In this manner, a specific guide sleeve 30 can be keyed to a certain location. For example, a guide having a locking tab formed to interact with a headrest support post can be positioned to interact with a specific post by applying the slot or irregularity to that location.

The holes 24 formed in the cross member 18 are preferably extruded including the flanges 26 that are used to distribute forces on the plastic headrest guide sleeves 30. The inner contact surfaces 28 formed by the flanges 26 engage and support the side walls of the body portion 32 of the guide sleeve 30 to provide lateral support to the guide sleeve 30 coupled to the cross member 18. In this manner, the plastic guide sleeve 30 will not interact with a sharp edge of metal, such as that formed by a standard hole having no flanged surfaces. That is, a flush or standard punched hole in the cross member 18 can result in the edge of the hole cutting through the plastic headrest guide sleeve 30, resulting in a failure of the headrest support system 10.

Referring again to FIG. 1, a headrest is shown at 44 for attachment to the seatback support frame 12 via the headrest support system 10. The headrest 44 includes a padded head support 46 and a pair of spaced apart elongated headrest support posts 48 extending longitudinally from the bottom of the head support 46 to a distal end 50. Once the guide sleeves 30 are aligned and positioned within the holes 24 in the upper cross member 18, the posts 48 are axially aligned with the center openings in the guide sleeves 30. The distal ends 50 of the posts 48 are received in the respective guide sleeves 30 to couple the headrest 44 to the seatback support frame 12. Further, the guide sleeves 30 and posts 48 may include adjustment and locking means for selectively and adjustably positioning and locking the headrest in various vertical positions relative to the seatback support frame 12 as is commonly known to one skilled in the art.

Figure 4:
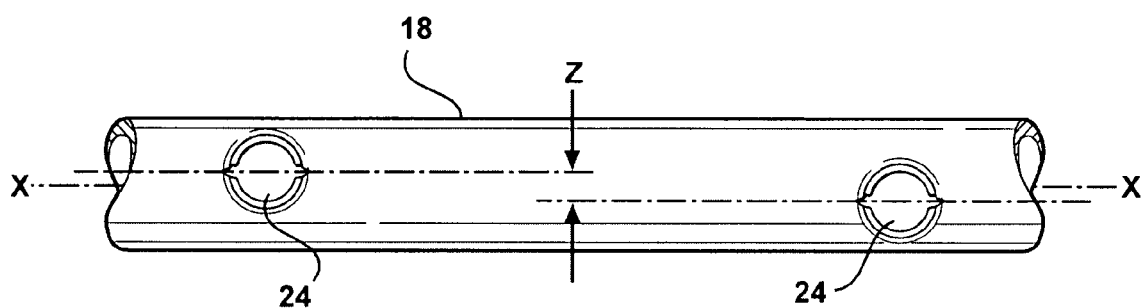
FIG. 4 is a top view of an alternative embodiment having two pairs of holes that are offset relative to each other for receiving the headrest support posts.

Referring to FIG. 4, there is shown an alternative embodiment of the headrest support system 10 of the present invention. The upper cross member 18 defines a longitudinal center axis X. The pair of holes 24 formed in the top and bottom surfaces 20, 22 of the cross member 18 are offset relative to each other, and relative to the center axis X, when viewed from the top. The amount of offset Z can be varied depending on a specific design parameter of various headrests. For example, the offset Z can be varied to accommodate the varying stiffness of different headrests. By varying the offset Z, the two holes 24 formed in the cross member 18 are slightly out of parallel in the top view; thereby, deflecting the headrest when the posts 48 are installed in the guides 30. The deflection of the headrest imposes forces on the entire system; thereby, eliminating excessive clearances within the system to control vibration and noise of the headrest support system 10.

The invention has been described in an illustrative manner, and it is to be understood that the terminology, which has been used, is intended to be in the nature of description rather than limitation.

Many modifications and variations of the present invention are possible in light of the above teachings. It is therefore to be understood that within the scope of the appended claims, the invention may be practiced other than as specifically described.

What is claimed is:

1. A headrest support system comprising:
a seatback support frame having an upper cross member adapted to support a headrest, said cross member having a pair of spaced apart holes formed therethrough;
a headrest guide sleeve received through each of said holes formed in said cross member to couple the headrest to said support frame;
wherein said holes include outwardly extending flanges defining an inner contact surface for engaging and supporting said headrest guide sleeve; and
wherein said cross member defines a longitudinal center axis where one of said holes is offset at least partially forwardly of said center axis and the other of said holes is offset at least partially rearwardly of said center axis.

2. A headrest support system as set forth in claim 1 wherein said headrest guide sleeve includes a body portion extending longitudinally between a disc-shaped top end and a tapered bottom end.

3. A headrest support system as set forth in claim 2 wherein said outwardly extending flanges of said holes define opposing inner contact surfaces for engaging and supporting said body portion of said guide sleeve.

4. A headrest support system as set forth in claim 3 wherein said headrest guide sleeve includes a raised rib extending longitudinally along said body portion.

5. A headrest support system as set forth in claim 4 wherein at least one of said holes formed in said cross member includes a slot formed therein for receiving said rib of said guide sleeve to rotationally align said guide sleeve with said cross member and prevent rotation of said guide sleeve relative to said cross member.

6. A headrest support system as set forth in claim 5 wherein said headrest guide sleeve include a slot through said body portion extending longitudinally between said top end and said bottom end for allowing said guide sleeve to flex upon insertion thereof through said holes in said cross member.

* * * * *